(12) United States Patent
Sathyanarayana

(10) Patent No.: US 7,403,811 B2
(45) Date of Patent: Jul. 22, 2008

(54) METHOD OF CATHETER TRACKING USING IMAGE INFORMATION

(75) Inventor: Shashidhar Sathyanarayana, Union City, CA (US)

(73) Assignee: SciMed Life Systems, Inc., Maple Grove, MN (US)

( * ) Notice: Subject to any disclaimer, the term of this patent is extended or adjusted under 35 U.S.C. 154(b) by 189 days.

(21) Appl. No.: 10/791,352

(22) Filed: Mar. 1, 2004

(65) Prior Publication Data

US 2005/0203369 A1 Sep. 15, 2005

(51) Int. Cl.
*A61B 5/05* (2006.01)

(52) U.S. Cl. .................. 600/424; 600/423; 606/130

(58) Field of Classification Search .......... 606/159, 606/169, 130; 600/423, 424
See application file for complete search history.

(56) References Cited

U.S. PATENT DOCUMENTS

| | | | |
|---|---|---|---|
| 4,100,916 A | 7/1978 | King | |
| 4,262,306 A | 4/1981 | Renner | |
| 4,686,692 A | 8/1987 | DeMeester et al. | |
| 4,791,934 A | 12/1988 | Brunnett | |
| 4,831,645 A | 5/1989 | Guenther et al. | |
| 4,907,252 A | 3/1990 | Aichinger et al. | |
| 5,318,025 A | 6/1994 | Dumoulin et al. | |
| 5,454,371 A | 10/1995 | Fenster et al. | |
| 5,474,073 A | 12/1995 | Schwartz et al. | |
| 5,559,335 A | 9/1996 | Zeng et al. | |
| 5,582,173 A | 12/1996 | Li | |
| 5,676,673 A | 10/1997 | Ferre et al. | |
| 5,792,147 A | 8/1998 | Evans et al. | |
| 5,797,849 A | 8/1998 | Vesely et al. | |
| 5,967,980 A | * 10/1999 | Ferre et al. | .................. 600/424 |
| 5,997,176 A | 12/1999 | Fairleigh | |

(Continued)

OTHER PUBLICATIONS

Laban, M. et al, "Angus: A New Approach To Three-Dimensional Reconstruction Of Coronary Vessels By Combined Use Of Angiography and Intravascular Ultrasound," Computers in Cardiology, 1995, Vienna, Austria Sep. 10-13, 1995, New York, NY, IEEE, US Sep. 10, 1995, pp. 325-328.

(Continued)

*Primary Examiner*—Brian L. Casler
*Assistant Examiner*—John F Ramirez
(74) *Attorney, Agent, or Firm*—Orrick Herrington & Sutcliffe LLP

(57) ABSTRACT

An improved method of tracking a catheter's position within a human body does not rely on x-rays, but instead calculates the position of the catheter's imaging head by analyzing image data. Such an analysis is able to determine the position of the imaging head in 3 dimensional space, relative to an arbitrarily selected reference image. An image is compared with the reference image, correlation data between corresponding points on the two images are gathered, and a correlation loss rate in a particular direction is determined. This correlation loss rate is modeled to an exponential function, which is evaluated to estimate an angle of separation between the image and the reference image. One or more angles of separation are used to determine a position in three dimensional space of the image, relative to the reference image. By repeating this process for a series of images being gathered by a catheter, the position of the catheter can be determined. Additionally, a 3 dimensional map of lumens in the human body can be created.

30 Claims, 7 Drawing Sheets

U.S. PATENT DOCUMENTS

| | | | |
|---|---|---|---|
| 6,019,725 | A | 2/2000 | Vesely et al. |
| 6,159,152 | A * | 12/2000 | Sumanaweera et al. ..... 600/443 |
| 6,236,704 | B1 | 5/2001 | Navab et al. |
| 6,298,261 | B1 | 10/2001 | Rex |
| 6,507,631 | B1 | 1/2003 | Takuno |
| 6,529,617 | B1 | 3/2003 | Prokoski |
| 6,542,770 | B2 | 4/2003 | Zylka et al. |
| 6,587,709 | B2 | 7/2003 | Solf et al. |
| 2004/0236220 | A1 * | 11/2004 | Willis .................. 600/443 |

OTHER PUBLICATIONS

Schwarzacher, Severin P. et al, "Enhancement of Spatial Orientation Of Intravascular Ultrasound Images With Side Holes In Guiding Catheters," American Heart Journal, vol. 135, No. 6 Part 1, Jun. 1998, pp. 1063-1066.

Gonzalez-Barbosa, J., et al: "Rover Localization In Natural Environments By Indexing Panoramic Images," Proceedings 2002 IEEE International Conference on Robotics and Automation (CAT. No. 02CH37292) IEEE Piscataway, NJ, USA, vol. 2, 2002, pp. 1364-1370.

US 5,924,990, 07/1999, Nachtomy et al. (withdrawn)

* cited by examiner

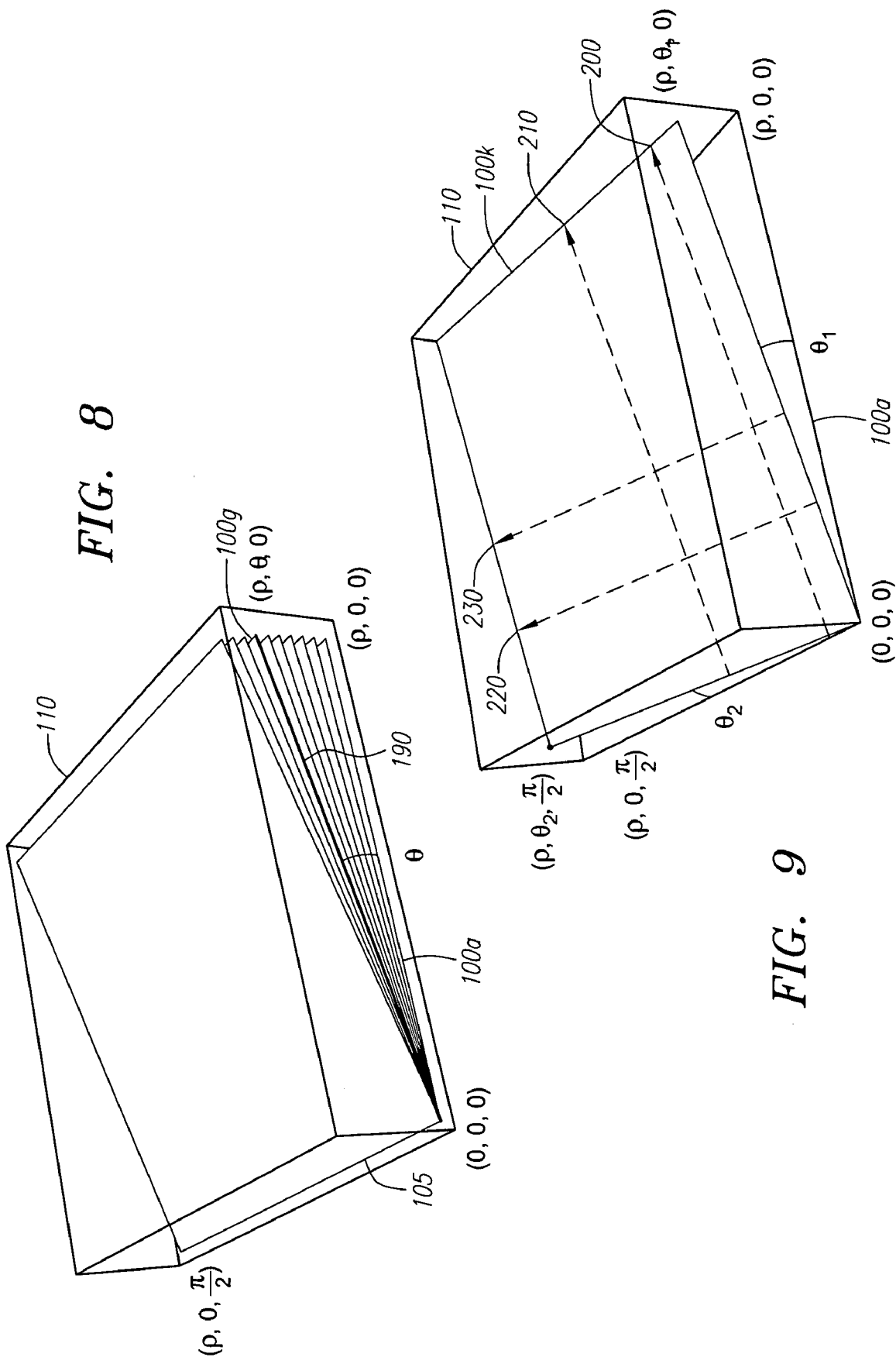

METHOD OF CATHETER TRACKING USING IMAGE INFORMATION

FIELD OF THE INVENTION

The field of the invention relates to medical devices, and more particularly, to methods for tracking catheters such as those used to conduct ultrasonic imaging.

BACKGROUND OF THE INVENTION

In the medical arts, catheters are frequently used to diagnose and treat various disorders in a patient, such as clogged or blocked blood vessels. A catheter is introduced into a blood vessel of a patient by, for example, making an incision in the patient over the blood vessel and inserting the catheter into the blood vessel of the patient. A catheter operator such as a physician then maneuvers the catheter through the blood vessels of the patient until the catheter is properly situated to diagnose or treat the disorder. Similar techniques are used to insert catheters into other types of lumens within a patient.

In maneuvering the catheter through the blood vessels or other lumens within the patient, there is a recurrent need to know the location of the catheter within the body space of the patient. Conventional imaging systems create an image of the blood vessel or other lumen which make the lumen appear as a straight tube, and provide no concept of 3-dimensional ("3-D") spatial relationships. In the patient, however, the lumens curve about, and contain branches that branch off at various angles from the lumen. If the position in three dimensions of the imaging head on the catheter can be determined, then through use of three-dimensional imaging software, the true positions and locations of the curves, twists, and turns, as well as the locations of the branch points, of the lumens can be determined. Knowing the true positions allows a more accurate map of the patient to be created, which yields more effective diagnosis and treatment of the patient. For example, gathering accurate 3-D position data allows for an accurate blood flow map and consequent blood flow monitoring and modeling.

Traditionally, X-ray technology has been used to provide a global roadmap of X-ray visible devices, showing their position within the patient. However, an X-ray image, being a two-dimensional projection, can only provide partial information on the 3-D shape of the catheter path. Furthermore, prolonged exposure to X-rays may be harmful to the patient, and it is therefore desirable to avoid such exposures. Thus there is a need for a tracking system which can easily determine the location of a catheter within a patient, without exposing the patient to harmful side effects, and which can be used with a wide variety of catheters or other imaging medical devices.

To overcome the problems inherent with X-ray tracking of catheters, various technologies have arisen which attempt to gather positional information about the location of a catheter within the patient, without the harmful side-effects of X-ray technology. Among such technologies are tracking systems which gather positional information using electromagnetic, optical, mechanical, acoustic, and/or inertial sensing elements. Many of these technologies require the addition of extra elements to the catheter, to allow it to be tracked within the patient.

Therefore there is a need for an improved method of tracking catheters.

SUMMARY OF THE INVENTION

For imaging catheters, the disadvantages of X-ray tracking can be avoided, without needing any additional equipment added on to the catheter, by relying on the data contained in the images collected by the imaging catheter itself to determine the position of the catheter within the body. This improved method can also be used with other forms of catheters, as long as the catheter has some ability to gather data about its immediate surroundings.

In this method, a first image gathered by the imaging catheter is compared to a second image gathered by the imaging catheter, and this comparison is used to compute one or more offset angles between the first and second images. This data is used to determine the relative position of the second image with respect to the first image. By making these determinations for each of a series of images, the orientation of the entire series of images, in three dimensions, can be determined. Since the orientation of an imaging catheter image is determined by the orientation of the imaging element at the tip of the imaging catheter, this method allows the position of the imaging element to be determined. This method also allows an imaging system to create a true or more true three-dimensional representation of the lumen that the catheter is traveling through.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the present inventions are obtained, a more particular description of the invention briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 8 shows the position of an image plane in polar coordinates, with respect to a reference plane.

FIG. 9 shows the position of a second image plane in polar coordinates, with respect to a reference plane.

DETAILED DESCRIPTION OF THE PREFERRED EMBODIMENTS

Figure 1:
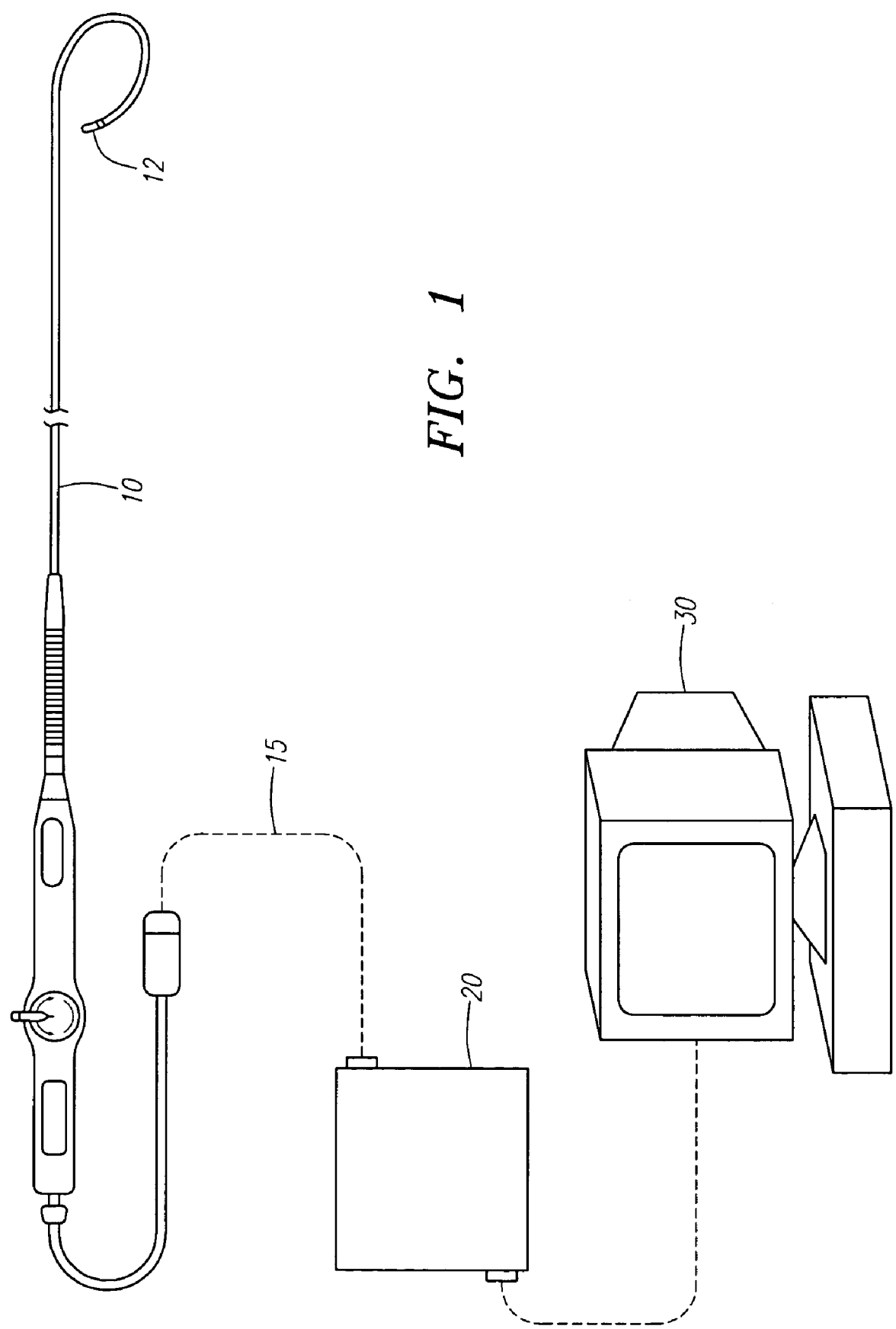
FIG. 1 is an imaging system in accordance with an example embodiment of the invention.

Turning to FIG. 1, an imaging system for use with an example embodiment of the invention includes an imaging catheter 10 coupled to a computer 20 which is executing imaging software to display images on a video display 30. The imaging catheter 10 includes an imaging head 12 located at the tip of the imaging catheter 10. The imaging head 12 may be an ultrasonic transducer, a light based imaging device, or any other device which gathers imaging data. The imaging catheter 10 is inserted into a lumen in a patient, such as a blood vessel. The imaging head 12 gathers image data from within the lumen of the patient, for example by collecting a cross section image of the lumen. In one specific embodiment, the imaging head 12 rotates about the axis of the catheter 10, and gathers a circular band of image data from the lumen by reflecting sound waves off of the lumen. Alternatively, light waves can be reflected off of the lumen and received by the imaging head 12. The imaging head 12 sends this image data down the catheter 10 along a data communication channel 15 such as a wire or fiber optic channel, to the computer 20. The computer 20 receives the image data, optionally processes the image data, and then displays the image data on the video display 30. In alternate embodiments, other image display devices may be used in place of the video display 30, such as holographic display units, printers, projectors, etc. In this example embodiment, the images taken by the imaging head 12 represent cross-sections with respect to the axis of the lumen in which the catheter 10 is traveling. In alternate embodiments, images captured by the imaging head 12 represent slices taken at angles other than cross-sections with respect to the axis.

Since the lumen is twisting, bending and curving about inside the patient, the lumen axis is constantly changing orientation, and thus the orientation of the images is also constantly changing. Additionally, the catheter operator may elect to alter the orientation of the imaging head within the lumen, for example to take an image of a particular portion of the lumen at a different angle in order to gather additional data about the lumen. To provide an accurate determination of the position of the imaging head 12, and thus provide an accurate map of the lumen, it is useful to determine the relative offset of each image from the image captured just previously. To conserve computing resources and time, it is possible to skip some of the images, and compute the relative offset of an image with some image other than the image captured just previously. This may result in a corresponding decrease in accuracy, but this may be acceptable depending on the particular situations the catheter 10 is being used in.

Figure 2:
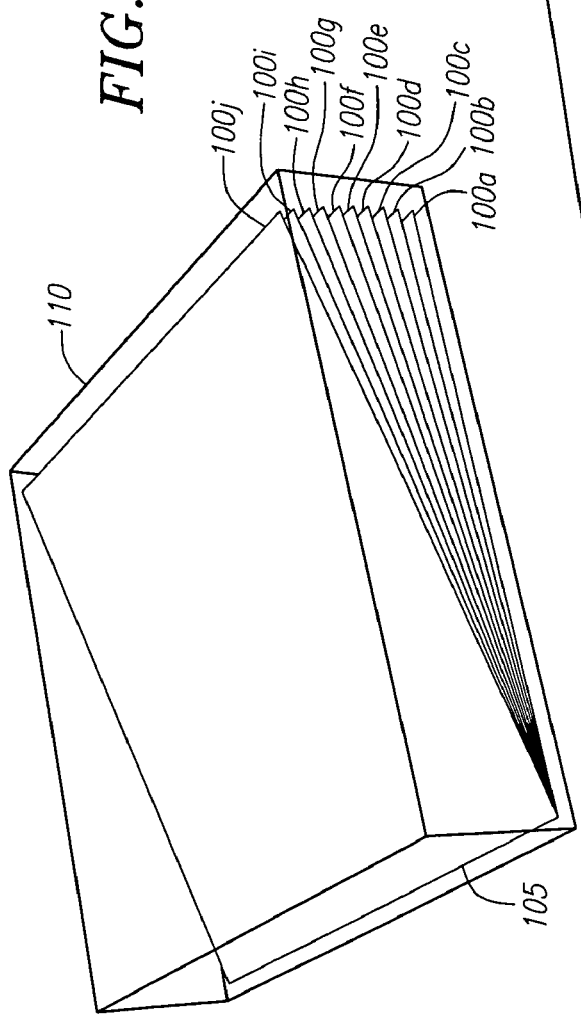
FIG. 2 is a series of image slices of a volume of material.

To simplify the discussion and more clearly explain the method of an embodiment of the invention, the following disclosure of the process of image comparison and position determination will use the example image slices shown in FIG. 2. The series of intersecting planes 100a-j within the volume box 110 represent image slices taken of a volume image of some biological material, such as a segment of a blood vessel or other lumen within a patient. The intersecting planes 100a-j all meet at the line of intersection 105, down the left side of FIG. 2. The intersecting planes 100a-j could be, for example, a series of images captured by the imaging head 12 as the catheter 10 was guided around a bend in the lumen, beginning with the plane 100a at the bottom of the volume box 110, and progressing through the other planes 100b-j towards the top of the volume box 110.

Figure 3:
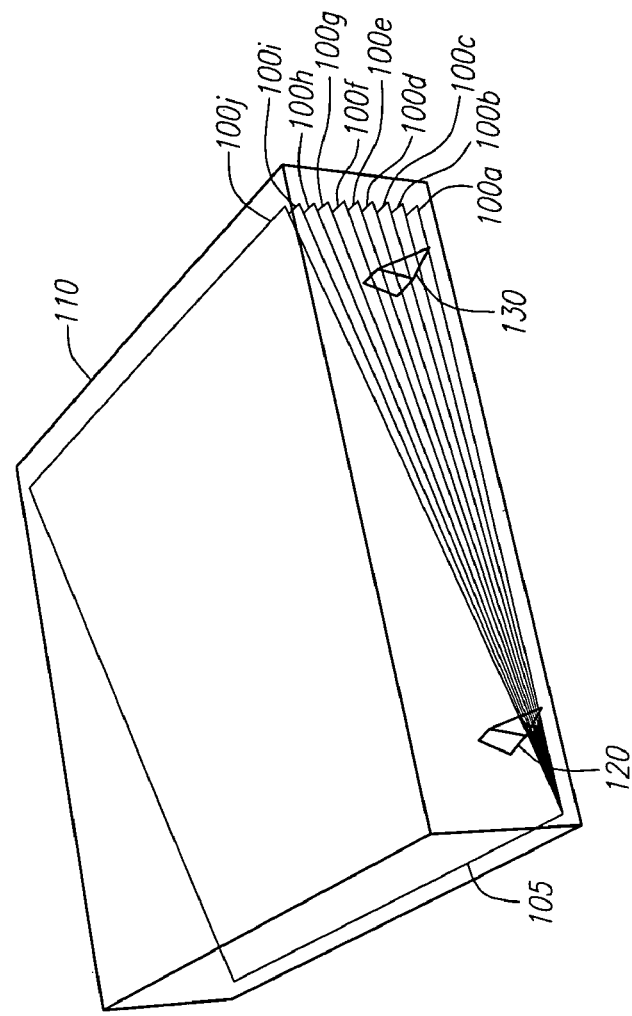
FIG. 3 is a series of image slices of a volume of material, including example objects within the volume of material.

Each plane 100a-j contains a slice of image data, such as an ultrasound image, or a light based image. The image data contained in each plane 100a-j changes, as the planes progress through the volume box 110. For example, turning to FIG. 3, the volume box 110 contains a first shape 120 and a second shape 130. Actual ultrasound or light based images would be more complex than the example presented here, but the same principles as disclosed apply to any sort of image data. This example has been simplified for clarity. The first shape 120 begins at the bottom of the volume box 110, at plane 100a, and continues up through each of the planes 100b-j, ending in the space above the last plane 100j. The second shape 130 is the same size and orientation as the first shape 120, but in a different location in the volume box. 110. The second shape 130 begins at the intersection point with the plane 100b, and extends upwards through each of the planes 100c-f, ending in the space between plane 100f and plane 100g. Planes 100a and 100g-j do not intersect the second shape 130.

Figure 4:
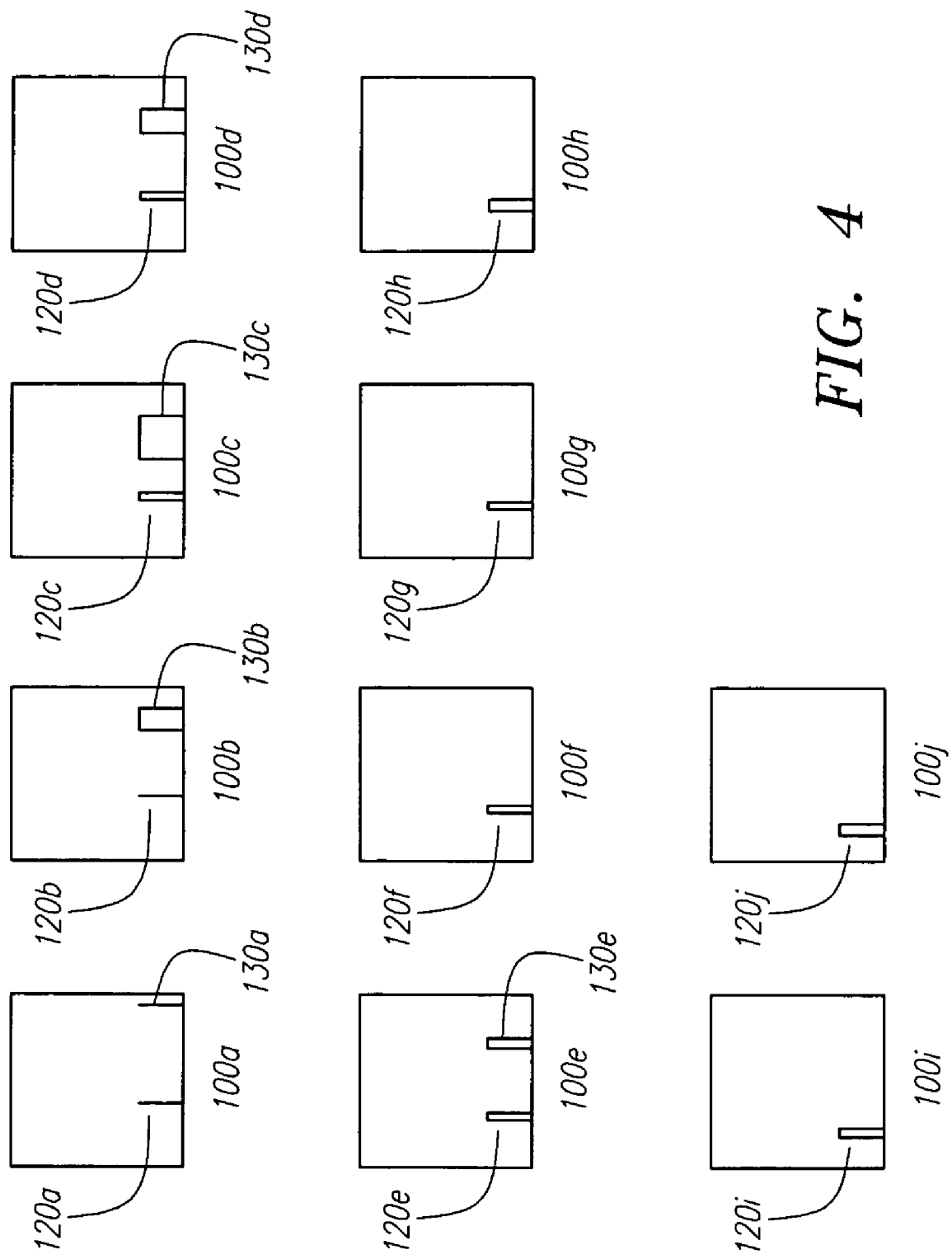
FIG. 4 is the series of image slices, showing the cross-sections of the example objects within each image slice.

The planes 100a-j intersect the shapes 120, 130, capturing a slice of image data for each shape 120, 130 at the intersection. The resulting series of planes 100a-j containing the slices 120a-j, 130a-e of the shapes 120, 130 are shown in FIG. 4. Plane 100a contains a small slice 120a of the first shape 120. Plane 100b contains a slightly larger slice 120b of the first shape 120, and a small slice 130a of the second shape 130. The slices 120a-j of the first shape 120 become progressively wider as the planes progress through the slices 120a-j of the first shape 120 from plane 100a to plane 100j. The slices 130a-e of the second shape 130 become at first wider and then narrow back down and eventually cease, as the planes progress through the slices 130a-e of the second shape 130.

As can be seen in FIG. 4, there are differences in the image slices on the planes 100a-j, as the planes progress through the shapes 120, 130. However, these differences are more pronounced on the right side of each plane 100a-j (for slices 130a-e of shape 130), as compared with the differences on the left side of each plane 100a-j (for the slices 120a-j of the same sized shape 120). These differences occur because the separation distance between adjacent planes, such as planes 100a-b, is greater at the right side than it is at the left side. Since the two planes 100a-b are further apart from each other on the right side, the correlation between the image slices 130a-b on the right side is correspondingly lower than the correlation between the image slices 120a-b in the same two planes 100a-b on the left side.

In the example of FIG. 4, the differences are determined by making a high-level comparison of the appearance of the two objects 120, 130 on each plane being examined. For other types of data, other ways of determining the difference and the variation of the difference across the image are possible. For example, if the data represents the density of a particular point on the plane (such as an ultrasound image), then the difference is calculated by measuring the difference in density values for the same point on each of the two planes. If the data represents visual image data, then the difference may be calculated by measuring the difference in some value or property associated with the visual image data, such as the color, hue, saturation, reflectivity, or density of the image at the same point on each plane.

In general, the correlation between any two of the planes 100a-j is greatest at the line of intersection 105 along the left side of each plane 100a-j, where all of the planes contain exactly the same image data. Correlation between pairs of planes 100a-j is gradually lost as we progress across the planes 100a-j from left to right. We will use the term "correlation loss" or "loss of correlation" to describe the local difference between the images being compared, which may be computed by a variety of methods. The particular method of computing the difference between images is a design choice for those skilled in the art, and is not critical to the embodiments of the invention disclosed herein. In this example, for ease of explanation, the correlation loss was measured across the planes 100*a-j* from left to right. The correlation loss may be measured in any direction across the planes 100*a-j* without affecting the results of the methods discussed herein.

Figure 5:
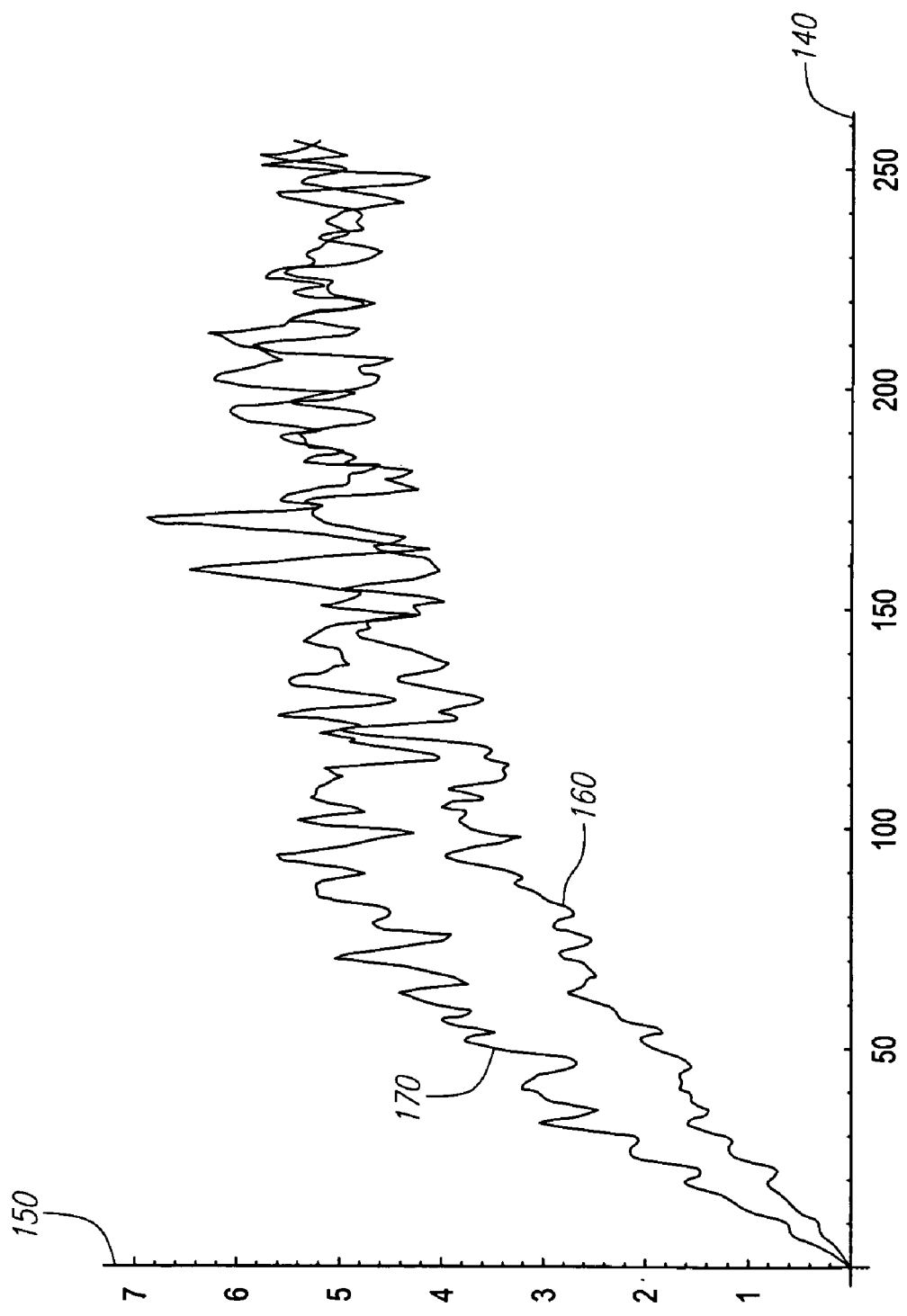
FIG. 5 is an example of a graph of the loss of correlation between two pairs of planes.

An example considering images taken across two pairs of planes (all intersecting along a common line) demonstrating the behavior of image differences with increasing distance from the common intersecting line is shown in the graph in FIG. 5. The horizontal axis 140 of the graph of FIG. 5 measures the distance away from the intersection line 105. The vertical axis 150 is a measure of the difference between the two planes 100*a-j* being compared. The lower data line 160 represents sample data gathered by comparing the image data on plane 100*a* with the image data on plane 100*b*. The upper data line 170 represents sample data gathered by comparing the image data on plane 100*a* with the image data on plane 100*c*. It is evident that the images in the pairs being considered start out being highly correlated (as evidenced by the small difference between them) and then gradually lose correlation (as evidenced by the difference becoming larger). The rate of correlation loss between planes 100*a* and 100*b* is less than the rate of correlation loss between planes 100*a* and 100*c*. This is due to the fact that the angle between plane 100*a* and plane 100*b* is smaller than the angle between plane 100*a* and plane 100*c*.

Figure 6:
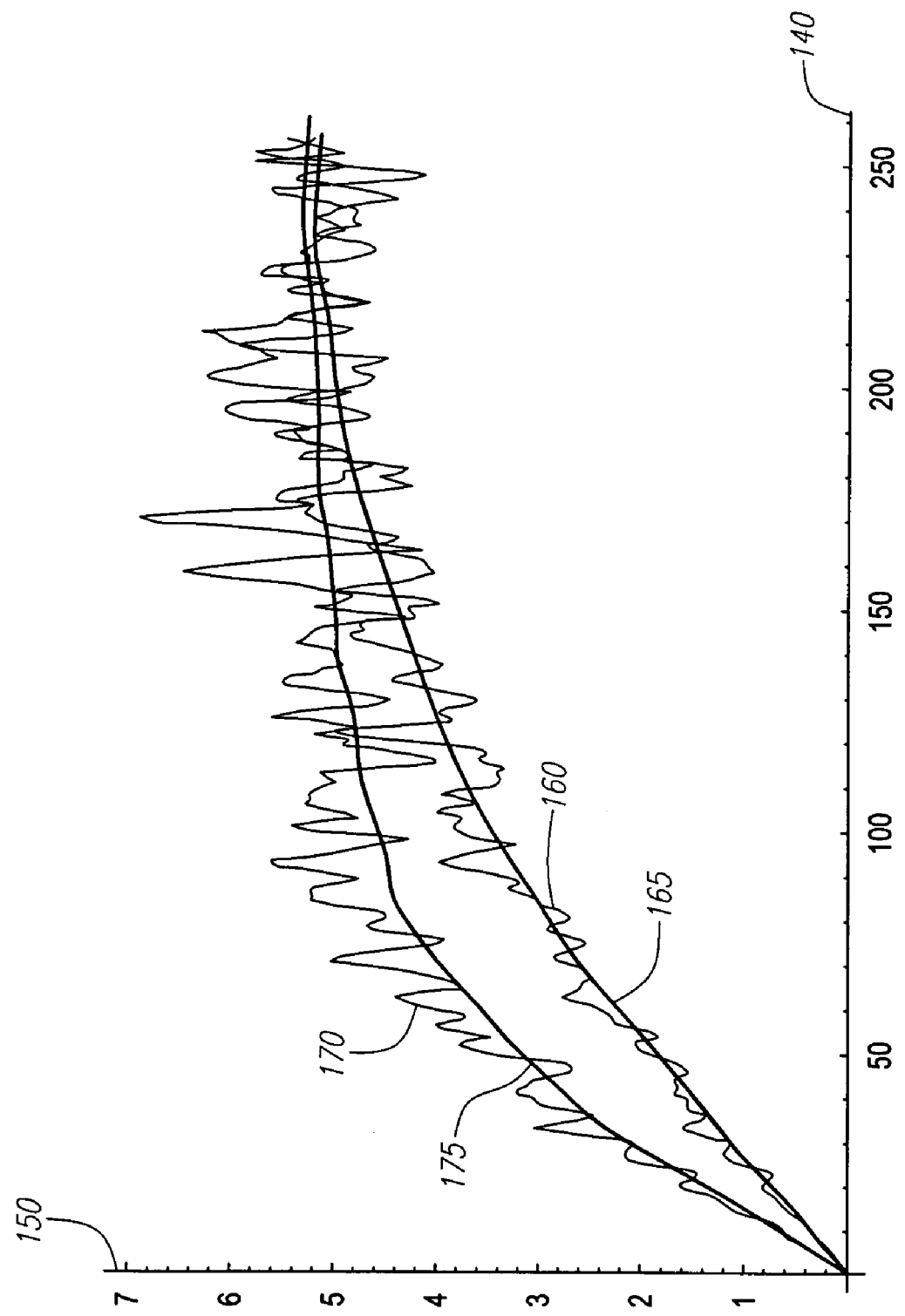
FIG. 6 shows the fitted exponential functions for the graph of FIG. 5.

Turning to FIG. 6, the difference between any two planes 100*a-j* can be approximated by an exponential function of the form $f(x)=A(1-e^{-\lambda x})$. Here A represents the value ultimately attained by the function and $\lambda$ is a parameter describing the rate at which the function increases as it attains the value A. The particular exponential function representing the behavior of the difference between any two planes 100*a-j* may be approximated using a best fit approximation method. The lower fitted exponential function 165 is an approximation for the lower data line 160. The upper fitted exponential function 175 is an approximation for the upper data line 170.

Calculating the derivative of each fitted exponential function 165, 175 at the origin (0,0), yields the value $A\lambda$ for each fitted exponential function 165, 175, which value is a good approximation of the angle of separation, in the direction of the correlation loss comparison, between the two planes 100*a*-100*j* being compared. Thus, the derivative of the lower fitted exponential function 165 at the origin is an approximation of the angle of separation between planes 100*a* and 100*b*. Similarly, the derivative of the upper fitted exponential function 175 at the origin is an approximation of the angle of separation between planes 100*a* and 100*c*.

Figure 7:
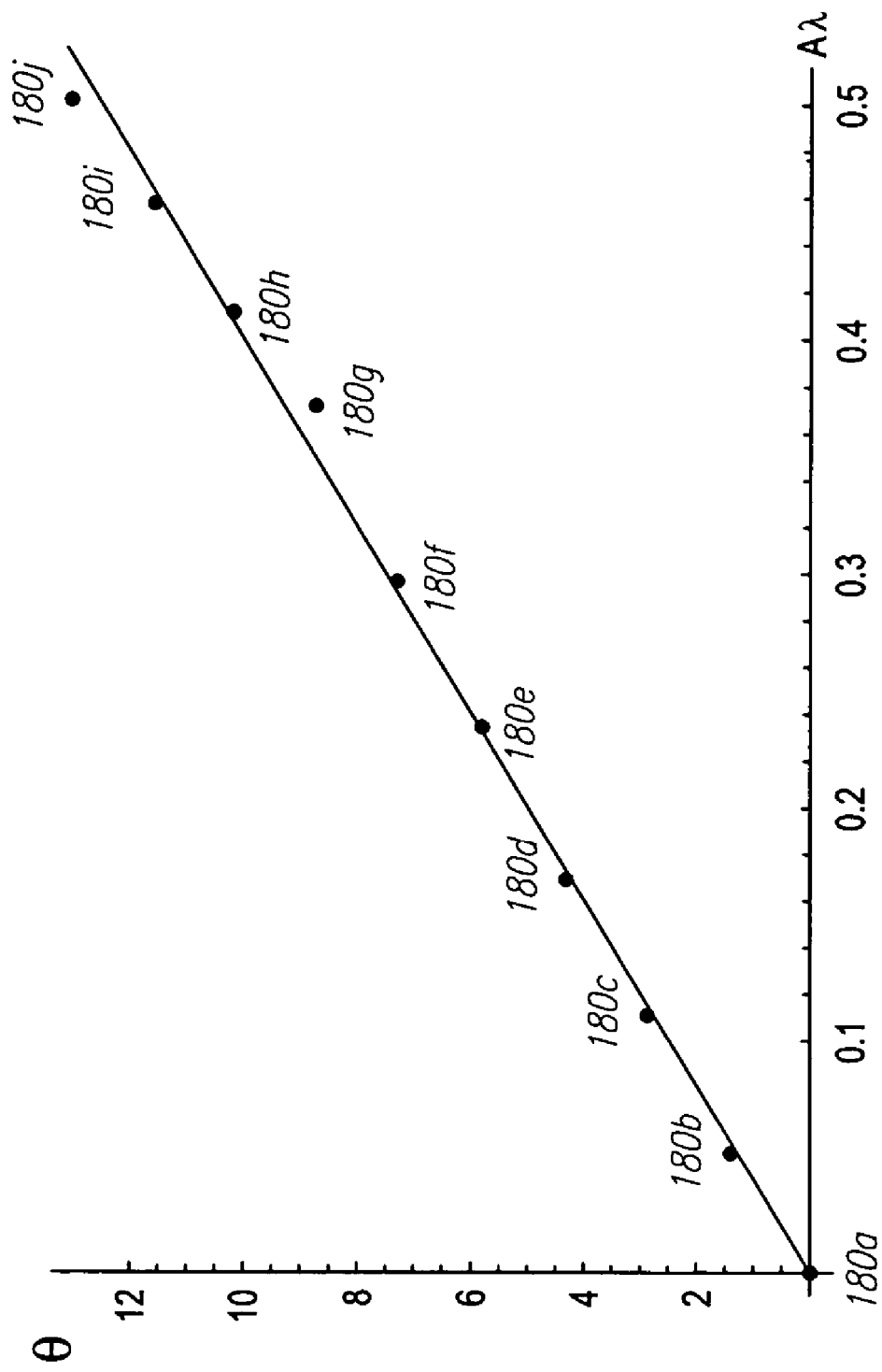
FIG. 7 is a graph of the relationship between derivatives of exponential functions and angles of separation.

FIG. 7 shows a graph of the relationship between 1) the derivatives of a series of fitted exponential functions approximating sample correlation data comparing each of planes 100*b-j* with plane 100*a* and 2) the angle of separation $\theta$ between each of planes 100*b-j* and plane 100*a*. For this sample data, the angle of separation $\theta$ between each pair of planes was already known. The horizontal axis represents the $A\lambda$ values which are approximated from the correlation comparisons discussed above. The vertical axis represents the known angle of separation $\theta$. The series of data points 180*a-j* represent the relationship between the approximated $A\lambda$ values and the known angles of separation $\theta$ for each plane 100*a-j* as compared with the reference plane 100*a*. Data point 180*a* represents the angle of separation between plane 100*a* and itself (i.e. zero), as related to the approximated $A\lambda$ value for the correlation comparison of reference plane 100*a* with itself (i.e. zero). Data point 180*b* represents the angle of separation between reference plane 100*a* and plane 100*b*, as related to the approximated $A\lambda$ value for the correlation comparison of plane reference 100*a* with 100*b*. Similarly, the data points 180*c-j* represent the angle of separation between the respective planes 100*c-j* and the reference plane 100*a*, as related to the approximated $A\lambda$ value for the correlation comparisons of the respective planes 100*c-j* with the reference plane 100*a*. In this example, the fitted line 185 demonstrates that the relationship between the $A\lambda$ values and the angles of separation $\theta$ is a linear relationship, and that the $A\lambda$ values are proportional to the angles of separation $\theta$. Thus the proportionality constant can be computed by dividing the known angle of separation values by the $A\lambda$ values. Therefore, using the process just described the angle of separation between any two planes in any given direction can be estimated by analyzing the rate of loss of correlation between the two planes in that direction.

Turning to FIG. 8, once the angle of separation $\theta$ between any plane 100*b-j* and the reference plane 100*a* is known, principles of geometry allow the relative position of the plane 100*b-j* with respect to the reference plane 100*a* to be calculated. For example, referring to plane 100*g*, the plane 100*g* is defined by the two lines 105, 190. Since both of these lines are calculatable with respect to the reference plane 100*a* using data gathered from the two images on the planes 100*a* and 100*g*, the position of the plane 100*g* is calculatable with respect to the plane 100*a*, using data gathered from the two images on the planes 100*a* and 100*g*.

Assume that the reference plane 100*a* is defined to begin at (0,0,0) in a three-dimensional polar coordinate system ($\rho$, $\theta$, $\phi$), with the reference plane 100*a* defined by the two intersecting lines (0,0,0)-($\rho$, 0, 0) and (0,0,0)-($\rho$, 0, $\pi/2$), where $\rho$ represents the width of the image on the reference plane 100*a*, $\theta$ represents the angle of inclination above the reference plane 100*a*, and $\phi$ represents the angle of counterclockwise rotation from the origin line (0,0,0)-($\rho$, 0, 0). The position of the plane 100*g* is defined by the position of the intersecting line 105, represented in polar coordinates as (0,0,0)-($\rho$, 0, 0) and line 190, represented in polar coordinates as (0,0,0)-($\rho$, $\theta$, 0). The value for $\rho$ is known from the dimensions of the reference plane 100*a*, and the value for $\theta$ is calculated using the correlation comparison of the image data in the plane 100*g* as compared with the reference plane 100*a* as discussed above. Therefore, the position of the plane 100*g* is determined using the information known about the reference plane 100*a* and the information gathered from the image data correlation comparison Note that the example presented above limited the correlation comparison to planes 100*a-j* that only varied from each other in one direction, since all of the planes 100*a-j* shared the line of intersection 105. This was done for ease of explanation of the principles of operation of the improved method of tracking a catheter using image data, but alternate embodiments of the method can easily calculate the position of other planes which have any arbitrary relationship to a reference plane 100*a*. For example, turning to FIG. 9, a plane 100*k* varies from the reference plane 100*a* in two directions. There is an angle $\theta_1$ between the reference plane 100*a* and the plane 100*k*, where the two planes 100*a*, 100*k* intersect the ($\rho$, 0, 0) axis, and an angle $\theta_2$ between the reference plane 100*a* and the plane 100*k*, where the two planes 100*a*, 100*k* intersect the ($\rho$, 0, $\pi/2$) axis.

To determine the angle $\theta_1$ between the reference plane 100*a* and the plane 100*k*, the correlation loss rate in the direction (0,0,0) to ($\rho$, 0, 0) is computed and approximated to an exponential function as described above. To determine the angle $\theta_2$ between the reference plane 100a and the plane 100k, the correlation loss rate in the direction (0,0,0) to ($\rho$, 0, $\pi/2$) is computed and approximated to an exponential function as described above. Note that while the correlation loss began at zero for the example of FIGS. 1-8, this will not always be the case for the example of FIG. 9. For any sampling line (such as the sampling lines 200, 210, 220, 230) across the plane 100k other than the sampling lines following the axes from (0,0,0) to ($\rho$, 0, 0) and from (0,0,0) to ($\rho$, 0, $\pi/2$), the correlation loss function will begin with a non-zero value, indicating that there is already some loss of correlation when the comparison begins. This effect merely means that the graph for the exponential function for these sample lines 200, 210, 220, 230 is shifted to the left by an amount proportional to the initial value for loss of correlation; it has no impact on the computation of the angles of separation $\theta_1$ or $\theta_2$.

Similarly, the position of planes which are parallel to each other in either or both of the (0,0,0) to ($\rho$, 0, 0) and (0,0,0) to ($\rho$, 0, $\pi/2$) directions can easily be computed using the methods discussed above. For any direction in which a plane is parallel to the reference plane 100a, the rate of correlation loss will be zero, and thus the angle of separation will be zero. If the plane does not intersect the reference plane 100a, then the initial value of the correlation loss function will be non-zero, but rate of correlation loss will remain at that non-zero value, thus indicating a parallel but non intersecting plane, in the direction of the correlation loss measurement.

Thus, the position of any plane may be determined, relative to the position of any arbitrarily selected reference plane, whether the plane intersects the reference plane or not, whether the plane is parallel to the reference plane or not, by comparing the image data contained in the two planes, and computing the rate of correlation loss in each of two directions, or sometimes in one direction, if it is known that the two planes intersect.

Expanding on the principles discussed above, once the position of a first plane is determined relative to a reference plane, then the position of a second plane relative to the first plane can be determined, by using the first plane as the reference plane and performing the position determination again. Thus an arbitrarily long chain of planes, positioned in three-dimensional space, may be constructed using the methods disclosed herein. Where these planes each contain image data gathered from a catheter, as the catheter travels through a lumen in a patient, this chain of planes represents a map of the lumen, in three dimensions.

In the foregoing specification, the invention has been described with reference to specific embodiments thereof. It will, however, be evident that various modifications and changes may be made thereto without departing from the broader spirit and scope of the invention. For example, the planes may have any orientation with respect to each other, not merely the orientations described above. The data compared for correlation loss could be any data for which a relative position computation is desired, and not merely the spatial image data described above. For example, images gathered at different points in time could be compared to determine age-triggered correlation losses. Further, the reader is to understand that the specific ordering and combination of process actions described herein is merely illustrative, and the invention can be performed using different or additional process actions, or a different combination or ordering of process actions. Features and processes known to those of ordinary skill in the art of medical devices may similarly be incorporated as desired. Additionally, features may be added or subtracted as desired. The specification and drawings are, accordingly, to be regarded in an illustrative rather than restrictive sense, and the invention is not to be restricted or limited except in accordance with the following claims and their legal equivalents.

I claim:

1. A method of tracking the position of an imaging head of a catheter in three-dimensional space within a human body, the method comprising:

receiving a first image captured by the catheter;

receiving a second image captured by the catheter, wherein the first image comprises a first data location and the second image comprises a second data location corresponding to the first data location;

comparing the first and second images to determine first correlation loss data between the first and second images, wherein determining the first correlation loss data comprises determining a difference in an image property between first image data stored in the first data location and second image data stored in the second data location;

determining a first rate of correlation loss between the first and second image in a direction using the first correlation loss data, wherein determining the first rate of correlation loss comprises determining a rate of change of the first correlation loss data;

determining a first angle of separation between the first and second images using the first rate of correlation loss; and determining first position data for the second image, relative to the first image, using the the first angle of separation; and outputting the first position data.

2. The method of claim 1, further comprising:

comparing the first and second images to determine second correlation loss data between the first and second images;

determining second position data for the second image, relative to the first image, using the second correlation loss data; and outputting the second position data.

3. The method of claim 2, wherein determining second position data for the second image comprises determining a second angle of separation between the first and second images using the second correlation loss data, and determining second position data for the second image, relative to the first image, using the second angle of separation.

4. The method of claim 2, wherein the first and second correlation loss data measure correlation loss in different directions.

5. The method of claim 2, wherein the first image comprises a first plane and the second image comprises a second plane.

6. The method of claim 5, wherein the first position data comprises a first line in three dimensions in the second plane and the second position data comprises a second line in three dimensions in the second plane, and wherein the first position data and the second position data define a position of the second plane in three dimensions.

7. The method of claim 1, wherein the first image comprises a first plane and the second image comprises a second plane.

8. The method of claim 7, wherein the first position data comprises a first line in three dimensions in the second plane.

9. The method of claim 1, wherein the image property comprises one or more of density, color, hue, saturation, or reflectivity.

10. The method of claim 1, wherein determining first correlation loss data further comprises repeating the determination for a plurality of data locations situated along a line in the first image and a corresponding line in the second image.

11. The method of claim 10, wherein the corresponding line in the second image is a projection onto the second image of the line in the first image.

12. The method of claim 1, wherein determining the rate of change of the correlation loss data comprises:
fitting a function to the first correlation loss data; and
computing a derivative of the function to determine the rate of change of the first correlation loss data.

13. The method of claim 1, wherein the first image comprises a first plane and the second image comprises a second plane, the first plane and the second plane being non-parallel to each other.

14. A computer program stored in a computer-useable medium, the computer program comprising a sequence of instructions which, when executed by a processor, causes the processor to execute a method of tracking the position of an imaging head of a catheter within a human body, the method comprising:
receiving a first image captured by the catheter;
receiving a second image captured by the catheter, wherein the first image comprises a first data location and the second image comprises a second data location corresponding to the first data location;
comparing the first and second images to determine first correlation loss data between the first and second images, wherein determining the first correlation loss data comprises determining a difference in an image property between first image data stored in the first data location and second image data stored in the second data location;
determining a first rate of correlation loss between the first and second image in a direction using the first correlation loss data, wherein determining the first rate of correlation loss comprises determining a rate of change of the first correlation loss data;
determining a first angle of separation between the first and second images using the first rate of correlation loss; and
determining first position data for the second image, relative to the first image, using the the first angle of separation; and
outputting the first position data.

15. The computer program stored in the computer-useable medium of claim 14, wherein the method further comprises:
comparing the first and second images to determine second correlation loss data between the first and second images;
determining second position data for the second image, relative to the first image, using the second correlation loss data; and
outputting the second position data.

16. The computer program stored in the computer-useable medium of claim 15, wherein determining second position data for the second image comprises determining a second angle of separation between the first and second images using the second correlation loss data, and determining second position data for the second image, relative to the first image, using the second angle of separation.

17. The computer program stored in the computer-useable medium of claim 15, wherein the first and second correlation loss data measure correlation loss in different directions.

18. The computer program stored in the computer-useable medium of claim 15, wherein the first image comprises a first plane and the second image comprises a second plane.

19. The computer program stored in the computer-useable medium of claim 18, wherein the first position data comprises a first line in three dimensions in the second plane and the second position data comprises a second line in three dimensions in the second plane, and wherein the first position data and the second position data define a position of the second plane in three dimensions.

20. The computer program stored in the computer-useable medium of claim 14, wherein the first image comprises a first plane and the second image comprises a second plane.

21. The computer program stored in the computer-useable medium of claim 20, wherein the first position data comprises a first line in three dimensions in the second plane.

22. The computer program stored in the computer-useable medium of claim 14, wherein the image property comprises one or more of density, color, hue, saturation, or reflectivity.

23. The computer program stored in the computer-useable medium of claim 14, wherein determining first correlation loss data further comprises repeating the determination for a plurality of data locations situated along a line in the first image and a corresponding line in the second image.

24. The computer program stored in the computer-useable medium of claim 23, wherein the corresponding line in the second image is a projection onto the second image of the line in the first image.

25. A system for mapping a lumen in a patient, comprising:
an imaging catheter adapted to capture a plurality of images of the lumen;
a computer adapted to receive the captured plurality of images, compute correlation loss data between each of the images and another one of the images by determining a difference in an image property between a first data location in the image and a second data location in the other image, compute rates of correlation loss in at least one direction using the correlation loss data by determining rates of change of the correlation loss data, determine angles of separation between the images using the rates of change of the correlation loss data and create a map of the lumen by determining a position in three dimensions of each of the plurality of images using the angles of separation; and
an output device adapted to output the map of the lumen.

26. The system of claim 25, wherein the output device comprises a video display.

27. The system of claim 25, wherein the computer determines the position of one of the plurality of images by comparing the image with a reference image whose position is known.

28. The system of claim 27, wherein the system is initialized by arbitrarily defining the position of the reference image.

29. The system of claim 27, wherein the position of the reference image is known based on a prior determination of the position by the computer.

30. The system of claim 29, further comprising approximating the rate of correlation loss using an exponential function.

* * * * *